March 25, 1947.  E. W. LERSCH  2,418,038
WHEEL RUNNER
Filed July 27, 1945
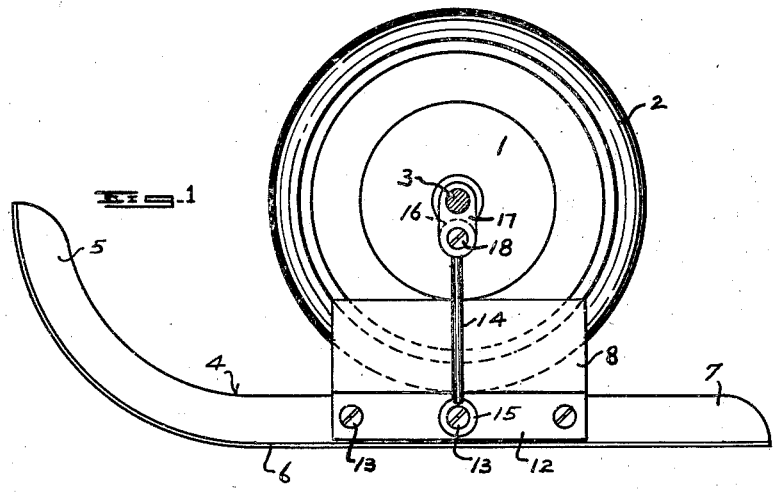
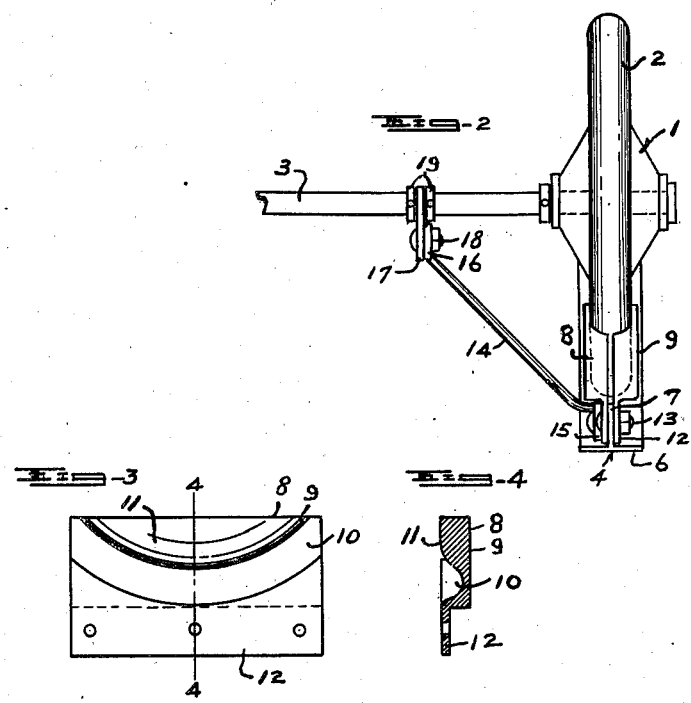
INVENTOR
EMIL W. LERSCH
BY
ATTORNEY Patented Mar. 25, 1947

2,418,038

UNITED STATES PATENT OFFICE 2,418,038

WHEEL RUNNER

Emil W. Lersch, Pensacola, Fla.

Application July 27, 1945, Serial No. 607,467

1 Claim. (Cl. 280—13)

This invention relates to a wheel runner, and important objects and advantages thereof are to provide a runner of the character described, which is adapted to be attached to each wheel of a child's wagon to convert the latter for use as a sled, which may be readily and conveniently attached to a wagon wheel or removed from the latter, which is simple in its construction and arrangement, durable and efficient in its use, and attractive in appearance, and comparatively economical in its manufacture.

To the accomplishment of these and such other objects as may hereinafter appear, the invention resides in the novel construction, combination and arrangement of parts herein specifically described and illustrated in the accompanying drawing, but it is to be understood that changes in the form, proportions and details of construction may be resorted to that come within the scope of the claim hereunto appended.

In the drawing wherein like numerals of reference designate corresponding parts throughout the several views:

Figure 1 is an inner side view of a wheel runner, constructed in accordance with the invention, and illustrating the connection of the runner with the wheel of a child's wagon.

Figure 2 is a rear view thereof.

Figure 3 is an inner side view of a clamping member, embodied in the present invention.

Figure 4 is a cross sectional view on line 4—4, Figure 3.

Referring in detail to the drawing 1 represents a metal wheel of a child's wagon. The wheel includes a rubber tire 2, and is revolubly mounted for rotation on one end of a fixed axle 3 in the usual manner.

The runner 4 is formed with an upwardly curved forward end portion 5, and is substantially inverted T-shaped in transverse cross section, comprising a base 6 and a vertically edgewise disposed flange 7.

The runner 4 is secured to the wheel 1 by a pair of identically constructed clamping members, respectively indicated at 8 and 9. The clamping members are substantially oblong, rectangularly shaped, and are positioned in opposed relation to each other, at respective sides of the wheel, and overlap and engage the lower portion of the latter.

The inner face of each of the clamping members 8 and 9 is formed with a curved recess 10 and with a curved cheek 11 to conform conversely to the contour of the face of the engaged side portion of the wheel, whereby the clamping member will seat snugly against the latter.

Each of the clamping members 8 and 9 includes a depending connecting flange 12. The connecting flanges are disposed against respective sides of the runner flange 7, and are apertured for the reception of screw bolts 13, which latter also extend through apertures provided therefor in the runner flange 7. The adjustment of the bolts will secure the clamping members to the runner 4 and clamp the wheel 1 securely between said clamping members.

To provide lateral stability to the runner attachment, an angularly disposed bracing rod 14 is employed. The lower end of the bracing rod is formed with a connecting eye 15, which is rigidly secured against the connecting flange 12 of the inner clamping member 8 by means of the center screw bolt 13.

The upper end of the bracing rod 14 is also formed with a connecting eye 16, which is rigidly secured against a side of a connecting link 17 by means of a screw bolt 18. The connecting link is pivotally mounted on the wagon axle 3, and is prevented from longitudinal movement on the latter by a pair of retaining collars 19, which are secured on the axle at respective sides of the connecting link.

It will be obvious that the linked connections of the bracing rods 14, in the manner stated, allow the oscillating movements of the runners 4, when a runner equipped wagon is used for usual sledding purposes. Such allowed oscillatory movements are necessary for the successful operation of the device, and is limited by the positions of the bracing rods when contacting with associated wagon parts. Further, due to the weight of the runners 4 and of the attachments for the latter, said runners return to and tend to maintain their normally suspended positions from the lower engaged portions of the wagon wheels.

In practice, it is desirable that the retaining collars 19 and the interposed connecting link 17 be permanently carried on the wagon axles 3, so that when the runners 4 are to be attached to or removed from the wheels 1, it will only be necessary to manipulate the involved screw bolts 13 and 18 to effect such operations.

It will be apparent that when the runner 4 is to be attached to a wheel structure differing from the conventional metal wheel herein shown, the clamping members would necessarily require conforming constructions to adapt same to wheel variations.

The present invention provides a most efficient device of its kind, which may be economically constructed, and successfully employed for the purpose and in the manner herein set forth

What I claim is:

The combination with a wheel revolubly mounted on a fixed axle, of a runner T-shaped in transverse cross section providing a vertically edgewise upwardly disposed runner flange, a pair of similar clamping members positioned in opposed relation to each other at respective sides of the wheel and engaging the lower portion of the latter, each of said members including a depending connecting flange engaging respective sides of the flange, a plurality of bolts extending through said runner flange and through said connecting flanges for attaching the latter to said runner flange and for clamping said members to the wheel, a connecting link pivotally mounted on the axle, a pair of retaining collars secured on the axle on respective sides of said link for preventing the longitudinal movement of the latter on the axle, and a bracing rod having its upper end secured to said link, the lower end of said rod being connected against one of said connected flanges by one of said bolts.

EMIL W. LERSCH.

REFERENCES CITED

The following references are of record in the file of this patent:

UNITED STATES PATENTS

| Number | Name | Date |
|---|---|---|
| 159,327 | Hyde | Feb. 2, 1875 |
| 403,322 | Blankart | May 14, 1889 |
| 821,974 | Allard | May 29, 1906 |
| 892,777 | Toennies | July 7, 1908 |
| 970,874 | Beffel | Sept. 20, 1910 |
| 1,078,936 | McGaughy | Nov. 18, 1913 |
| 1,267,789 | Nelson | May 28, 1918 |
| 1,522,816 | Ghent et al. | Jan. 13, 1925 |
| 1,642,714 | Barrett | Sept. 20, 1927 |
| 2,352,966 | Morando | July 4, 1944 |